US012583283B2

(12) United States Patent
Li et al.

(10) Patent No.: US 12,583,283 B2
(45) Date of Patent: Mar. 24, 2026

(54) ELECTRIC VEHICLE INDIRECT HEAT PUMP SYSTEM WITH MULTIPLE HEAT RECOVERY AND ENHANCED REFRIGERANT COOLING

(71) Applicant: FCA US LLC, Auburn Hills, MI (US)

(72) Inventors: Meng Li, Lake Orion, MI (US); Craig A Lindquist, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 314 days.

(21) Appl. No.: 18/345,131

(22) Filed: Jun. 30, 2023

(65) Prior Publication Data

US 2025/0001829 A1    Jan. 2, 2025

(51) Int. Cl.
B60H 1/00      (2006.01)
B60H 1/14      (2006.01)
B60H 1/32      (2006.01)

(52) U.S. Cl.
CPC ..... B60H 1/00392 (2013.01); B60H 1/00899 (2013.01); B60H 1/143 (2013.01); B60H 1/3228 (2019.05)

(58) Field of Classification Search
CPC ...................... B60H 1/00392; B60H 1/00899; B60H 1/143; B60H 1/3228; B60H 1/00278; B60H 2001/00307; B60H 1/32284
See application file for complete search history.

(56) References Cited

U.S. PATENT DOCUMENTS

| | | | |
|---|---|---|---|
| 7,789,176 B2 | 9/2010 | Zhou | |
| 7,841,431 B2 | 11/2010 | Zhou | |
| 8,448,696 B2 | 5/2013 | Johnston et al. | |
| 2022/0161630 A1* | 5/2022 | Lindquist et al. | ... B60H 1/2221 |
| 2024/0109393 A1* | 4/2024 | Oh et al. | ............ B60H 1/32284 |
| 2024/0140163 A1* | 5/2024 | Mancini et al. | ... B60H 1/32281 |
| 2025/0018786 A1* | 1/2025 | Tiemeyer | ........... B60H 1/00914 |

FOREIGN PATENT DOCUMENTS

| | | | | |
|---|---|---|---|---|
| CN | 218287365 U | * | 1/2023 | ........... B60H 1/3228 |
| CN | 118769798 A | * | 4/2023 | ........... B60H 1/3228 |

OTHER PUBLICATIONS

CN 118769798 A Translation (Year: 2023).*
CN 218287365 U Translation (Year: 2023).*

* cited by examiner

*Primary Examiner* — Jerry-Daryl Fletcher
*Assistant Examiner* — Dario Antonio Deleon
(74) *Attorney, Agent, or Firm* — Jeremy J. Klobucar

(57)                ABSTRACT

A vehicle thermal management system includes a heat pump system, a cabin coolant loop, a low-temperature coolant loop. The heat pump system includes a compressor, a water condenser, an outside heat exchanger, a chiller, an evaporator, a gas-liquid accumulator, a first electronic expansion valve, a second electronic expansion valve, a third electronic expansion valve, and a first four-way valve. The cabin coolant loop includes a first water pump, a coolant heater, a one-way valve, and a heater core. The low-temperature coolant loop includes an electric drive cooling module, a battery pack, a second water pump, a second four-way valve, a three-way valve, a radiator and a hot bottle. A fan and a blower are used to control the front end and cabin airflow. The vehicle thermal management system to provide multiple working modes to assure cabin thermal comfort, control humidity and component temperature with low energy consumption.

3 Claims, 12 Drawing Sheets

ELECTRIC VEHICLE INDIRECT HEAT PUMP SYSTEM WITH MULTIPLE HEAT RECOVERY AND ENHANCED REFRIGERANT COOLING

FIELD

The present application generally relates to electric vehicles and, more particularly, to a thermal management system of an electric vehicle.

BACKGROUND

Electric vehicles have shown competitive advantages compared with vehicles that use internal combustion engine because of low energy cost and improved power performance. In an electric vehicle, the thermal management system usually consumes a significant amount of energy, especially at low ambient temperatures, and hence compromises a driving range of the vehicle. Since a heat pump system can extract energy from the environment or other media to be transferred to a heater core, this arrangement shows advantages of high operating efficiency compared with electric heating elements such as a positive temperature coefficient heater.

Known prior art thermal management systems typically only include a working mode of absorbing heat from the environment or a single heat source at low temperatures, and the waste heat generated by multiples sources, including a battery pack, motor and power electronics, is not fully utilized. Moreover, a battery pack will generate a large amount of heat during high-power fast charging, which can present challenges to existing thermal management systems when attempting to coordinate battery charging cooling and cabin cooling at high ambient temperatures. Therefore, it is desirable to develop a vehicle thermal management system that improves the heating and cooling performances at low and high ambient temperature conditions with low energy consumption.

SUMMARY

To achieve the above and other objectives, the present disclosure presents a thermal management system for electric vehicles, including a heat pump system, a cabin coolant loop, and a low-temperature coolant loop. The heat pump system includes a compressor, a water condenser, an outside heat exchanger, a chiller, an evaporator, a gas-liquid accumulator, a first electronic expansion valve, a second electronic expansion valve, a third electronic expansion valve, and a first four-way valve. The cabin coolant loop includes a first water pump, a coolant heater, a one-way valve, and a heater core. The low-temperature coolant loop includes an electric drive cooling module, a battery pack, a second water pump, a second four-way valve, a three-way valve, and a hot bottle. A fan and a blower are used to control vehicle front end and cabin airflow.

According to an aspect of the present disclosure, the vehicle thermal management system provides heat recovery from both the electric drive system and the battery pack. When frosting occurs on an outside heat exchanger, the electric drive system can directly heat the cabin with coolant loop connections. At high ambient temperatures, the water condenser in the thermal management system can be used to enhance the cooling performance of the refrigerant loop, which tackles the high thermal load of the battery pack and cabin cooling. The vehicle's thermal management requirements are met under all-weather conditions, and energy consumption can be reduced through flexible operating mode switching.

According to an aspect of the present disclosure, the control module realizes communication connection with following components, including the compressor, the first electronic expansion valve, the first four-way valve, the second electronic expansion valve, the third electronic expansion valve, the first water pump, the coolant heater, the electric drive cooling module, the second four-way valve, the first one-way valve, the first three-way valve, the second water pump, the fan, and the blower. The control module controls the refrigerant flow by controlling the compressor speed, the opening of the first electronic expansion valve, the opening of the second electronic expansion valve, the opening of the third electronic expansion valve, and the opening of the four-way switching valve. The control module controls the coolant flow by controlling the speed of the first water pump and the second water pump, the opening of the three-way valve, the opening of the one-way valve, and the opening of the second four-way valve. The control module controls the coolant heater for heat generation, and air flow by controlling the speed of the fan and the blower. The control module controls the heating power by controlling the electric heater current. The control logic of the thermal management system is simple and clear, which is easy to implement.

According to an aspect of the present disclosure, the vehicle thermal management system under a heat pump mode uses the ambient environment as a heat source to heat the cabin at low temperatures, which assures the cabin thermal comfort.

According to an aspect of the present disclosure, the vehicle thermal management system under the heat pump mode uses the ambient environment as the heat source and is possibly assisted by the coolant heater to heat the battery pack at low ambient temperatures, which reduces an internal resistance and alleviates an aging issue of the battery system at cold ambient conditions.

According to an aspect of the present disclosure, waste heat of the electric drive system is absorbed by the thermal management system through a chiller heat exchange between the coolant and the refrigerant. This working mode avoids a frosting problem of an outside heat exchanger after continuous operation of the heat pump system and ensures efficient cabin heating.

According to an aspect of the present disclosure, the waste heat of the battery system is absorbed by the thermal management system through chiller heat exchange between the coolant and the refrigerant. This working mode ensures efficient operation of the heat pump system through battery system waste heat recovery.

According to an aspect of the present disclosure, the waste heat of the electric drive system is recovered to heat the cabin at low ambient temperatures, which reduces system power consumption by turning off the heat pump system and the coolant heater.

According to an aspect of the present disclosure, the heat pump system reduces humidity of the cabin air with the evaporator, and the coolant heater is used to maintain appropriate cabin temperature. This working mode can be used for windshield defogging or defrosting.

According to an aspect of the present disclosure, a low-temperature cooling loop cools both the electric drive system and the battery with the radiator at medium ambient temperatures, which saves energy for battery cooling.

According to an aspect of the present disclosure, the heat pump system cools the cabin with the evaporator and cools the battery with the chiller at high ambient temperatures, and the electric drive system is cooled with the radiator.

According to an aspect of the present disclosure, all subsystems can be effectively cooled at high ambient temperatures: the cabin is cooled by the evaporator in the heat pump system; the electric drive system is cooled by the radiator; the battery system is cooled by the chiller in the heat pump system. The water condenser in the heat pump system enhances the cooling performance with additional heat dissipation through the radiator. Such mode also supports a battery fast charge application when the heat generation of the battery system is high.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

Figure 1:
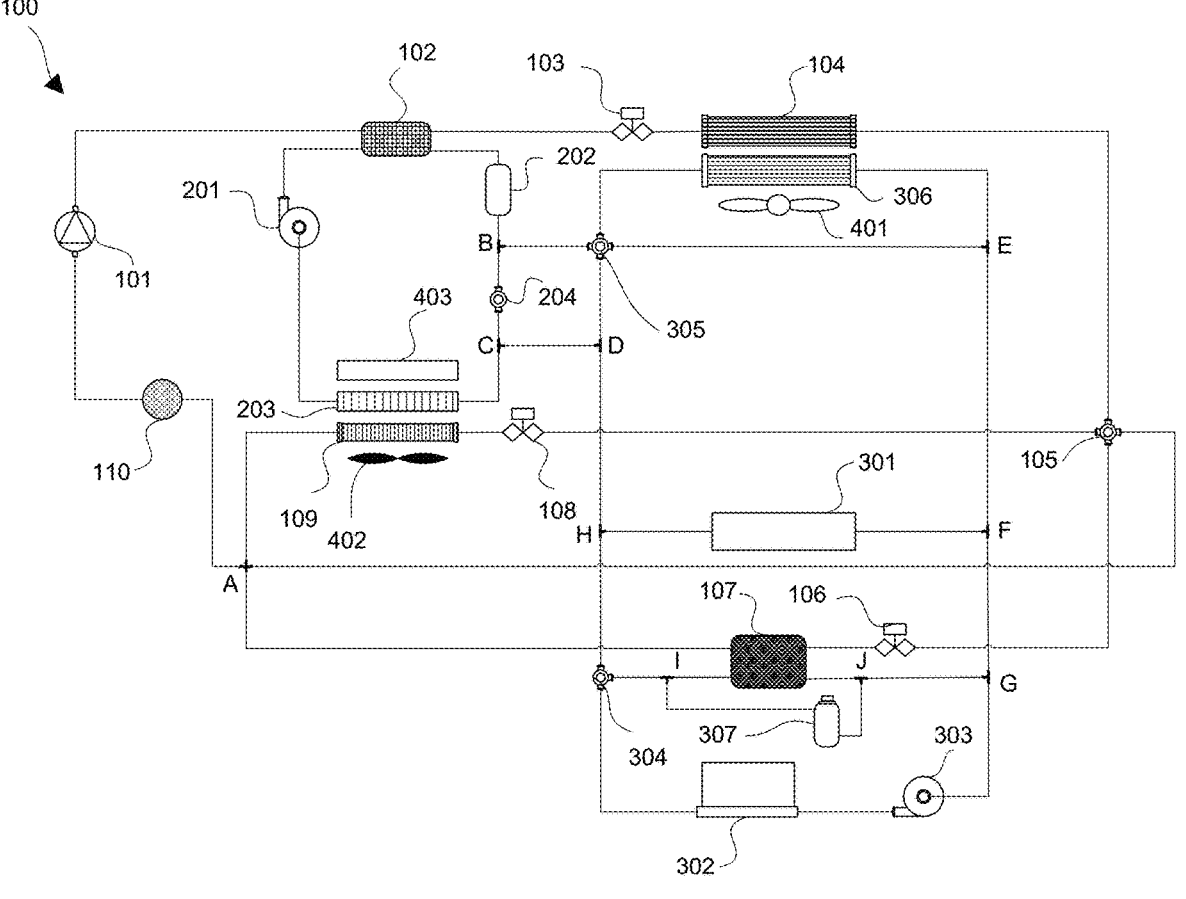
FIG. 1 is a system diagram of a vehicle thermal management system according to an embodiment of the present application.

FIG. 1 is a system schematic of a vehicle thermal management system 100 by illustrating various components and their associated connections. The vehicle thermal management system 100 includes a compressor 101, a water condenser 102, an outside heat exchanger 104, a chiller 107, an evaporator 109, a gas-liquid accumulator 110, a first expansion valve 103, a second expansion valve 106, a third expansion valve 108, a first four-way valve 105, a first water pump 201, a coolant heater 202, a one-way valve 204, a heater core 203, an electric drive cooling module 301, a battery 302, a second water pump 303, a second four-way valve 305, a three-way valve 304, a radiator 306, a hot bottle 307, a fan 401, and a blower 402.

The selection and function of each component of the vehicle thermal management system 100 are described as follows. The compressor 101 adopts a scroll type or other types of electric compressors, and its function is to compress the refrigerant into superheated steam and push it to flow in the refrigerant circulation system. The first water pump 201 and the second water pump 303 are electric water pumps, which push the coolant to flow in the coolant loop system. The water condenser 102 and the chiller 107 are coolant-refrigerant heat exchangers, which provide heat exchange between the coolant and the refrigerant. The outside heat exchanger 104 is an air-refrigerant heat exchanger, which provides heat exchange between the ambient air and the refrigerant. The radiator 306 is an air-coolant heat exchanger, which provides heat exchange between the ambient air and the coolant. The coolant heater 202 can be a positive temperature coefficient heater or other types of coolant heaters to convert electric power into heating power.

The first expansion valve 103 and the second expansion valve 106 can be electromagnetic expansion valves or electronic expansion valves, and the temperature accuracy of the degree of superheat or the degree of subcooling can be achieved by controlling the opening of the valves. The fan 401 is an electric fan and provides a required air flow for the heat exchange between the refrigerant and the air in the outside heat exchanger 104, and the heat exchange between the coolant and the air in the radiator 306. The blower 402 is an electric blower configured to provide the required air flow for the heat exchange between the refrigerant and the air in the indoor heat exchanger.

The gas-liquid accumulator 110 is used to separate liquid refrigerant and gas refrigerant in the refrigerant cycle. The one-way valve 204, the three-way valve 304, the first four-way valve 105, and the second four-way valve 305 may be electromagnetic valves or other types of controllable valves. The purpose of the valves is to control a fluid connection and disconnection of adjacent parts associated with its valve ports, so that different operating modes can be realized.

Figure 2:
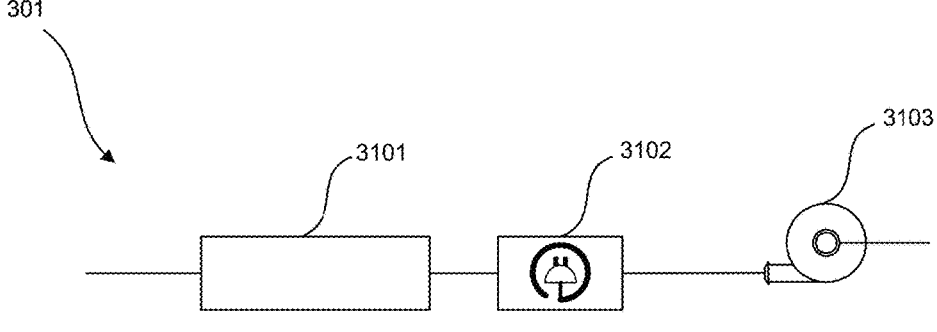
FIG. 2 is a schematic diagram of an internal structure of an electric drive cooling module of single motor configuration in FIG. 1 according to an embodiment of the present application.
Figure 3:
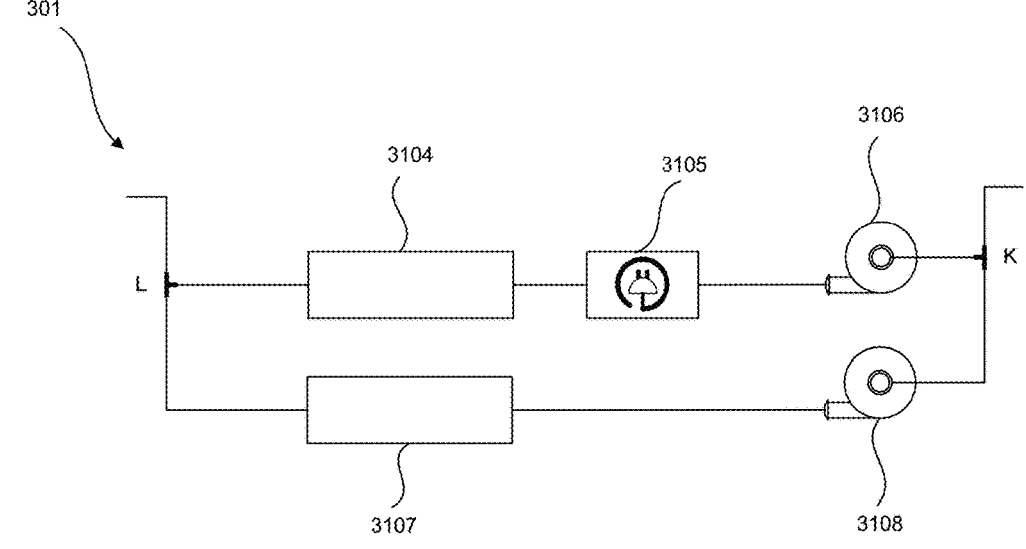
FIG. 3 is a schematic diagram of an internal structure of an electric drive cooling module of a two-motor configuration in FIG. 1 according to an embodiment of the present application.

FIGS. 2 and 3 show internal structures of the electric drive cooling module 301. For the electric drive of a single motor configuration shown in FIG. 2, a water pump 3103 pumps coolant flow through a charger 3102 and an electric drive system 3101 inclusive of an electric motor to cool the components. For the electric drive of a two-motor configuration shown in FIG. 3, a water pump 3106 pumps coolant flow through a charger 3105 and an electric motor drive system 3104, and a water pump 3108 pumps coolant flow through an electric motor drive system 3107. The pipeline junctions K and L indicate the inlet and the outlet of the coolant flow, respectively.

The vehicle thermal management system 100 can be viewed as essentially including a heat pump system, a cabin coolant loop, and a low-temperature coolant loop. The heat pump system includes the compressor 101, the water condenser 102, the outside heat exchanger 104, the chiller 107, the evaporator 109, the gas-liquid accumulator 110, the first electronic expansion valve 103, the second electronic expansion valve 106, the third electronic expansion valve 108, the first four-way valve 105 and conduit or the like connecting these components as shown in the various figures. The cabin coolant loop includes the first water pump 201, the coolant heater 202, the one-way valve 204, the heater core 203, and conduit or the like connecting these components as shown in the various figures. The cabin coolant loop is also in heat exchange communication with the heat pump system loop via water condenser 102. The low-temperature coolant loop includes the electric drive cooling module 301, the battery pack 302, the second water pump 303, the second four-way valve 305, the three-way valve 304, the radiator 306, the hot bottle 307, and conduit or the like connecting these components as shown in the various figures. The low temperature coolant loop is also in heat exchange communication with the heat pump system loop via chiller 107. The fan 401 and the blower 402 are used to control the front end and cabin airflow. In some implementations, the low temperature coolant loop can be in coolant communication with the cabin coolant loop. In some implementations, the low temperature coolant loop can be separated into sub-loops by control of the appropriate valves. In some implementations, the sub-loops include a battery pack coolant sub-loop and an electric drive coolant module coolant sub-loop.

Figure 4:
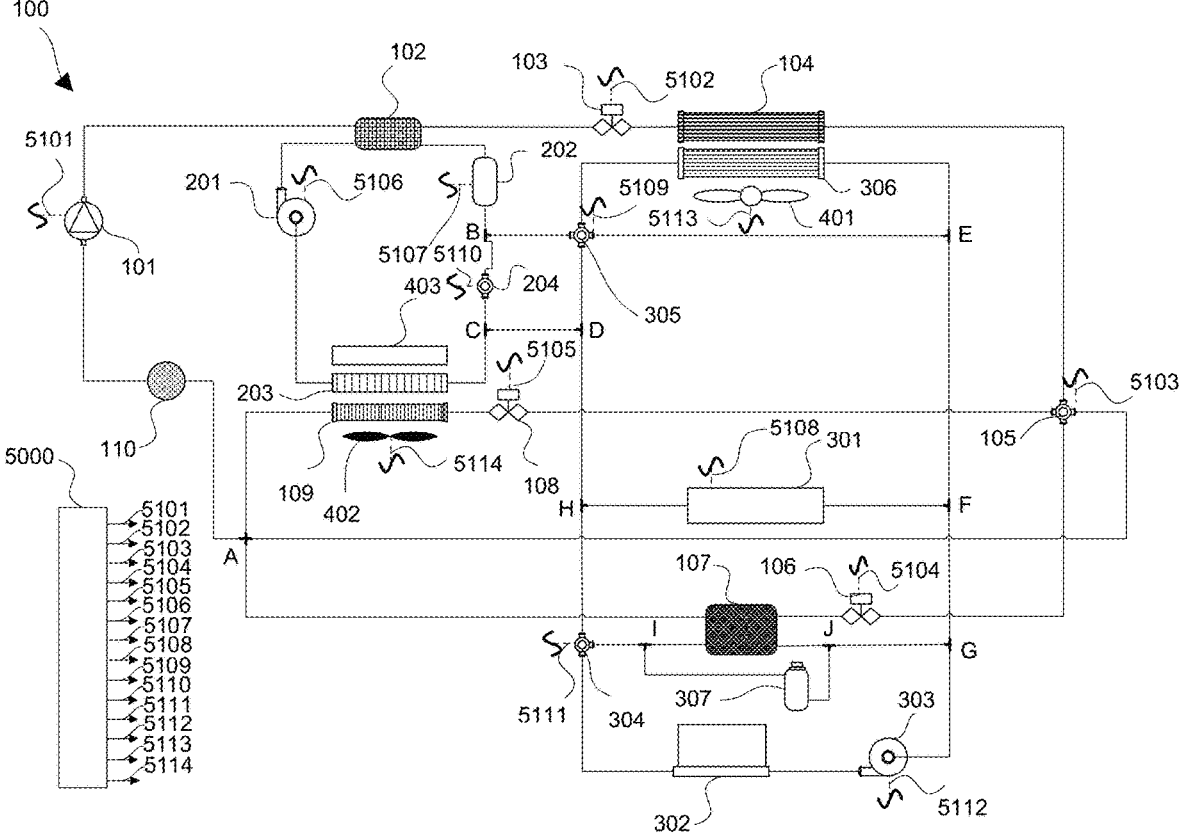
FIG. 4 is a schematic diagram of a communication connection between a control module of FIG. 1 and each actuator of the vehicle thermal management system according to an embodiment of the present application.

FIG. 4 shows an example of signal communication between a control module 5000 and each actuator of the vehicle thermal management system. The control module 5000 determines a working status of each actuator of the vehicle thermal management system 100. The control module 5000 output signals, 5101, 5102, 5103, 5104, 5105, 5106, 5107, 5108, 5109, 5110, 5111, 5112, 5113, and 5114 are respectively connected to the compressor 101, the first expansion valve 103, the first four-way valve 105, the second expansion valve 106, the third expansion valve 108, the first water pump 201, the coolant heater 202, the electric drive cooling module 301, the second four-way valve 305, the first one-way valve 204, the first three-way valve 304, the second water pump 303, the fan 401, and the blower 402.

Figure 5:
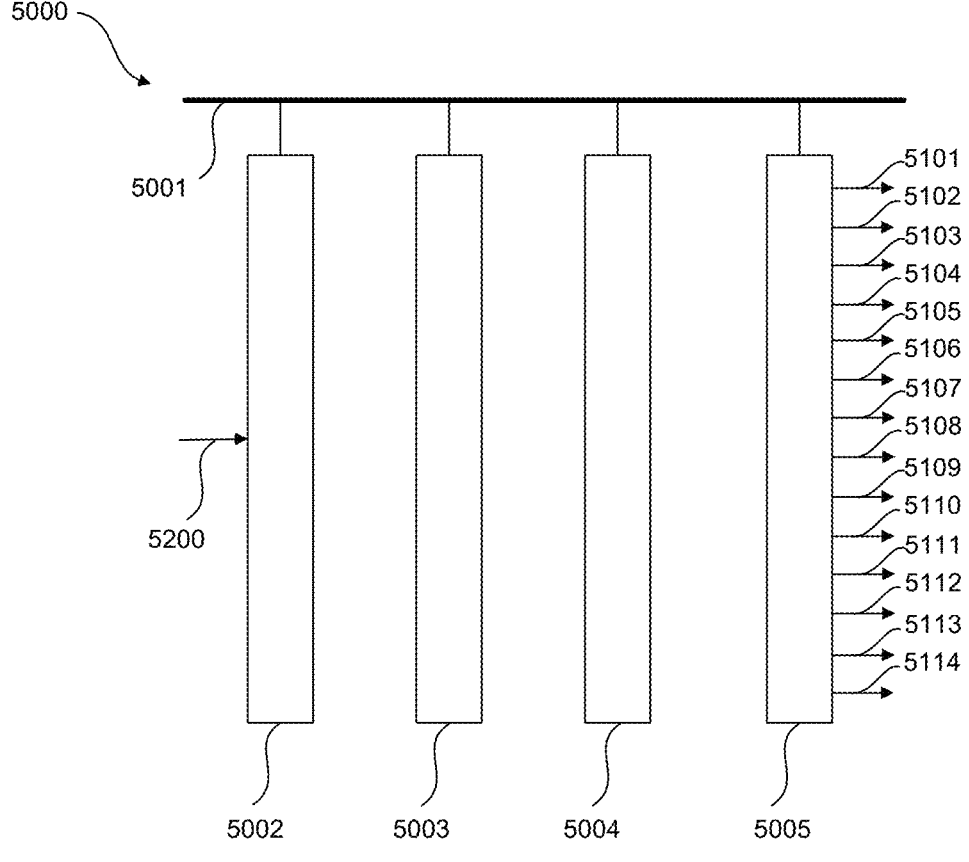
FIG. 5 is a schematic internal structure diagram of the control module shown in FIG. 4 according to an embodiment of the present application.

FIG. 5 illustrates an internal structure of the control module 5000 shown in FIG. 5. The control module 5000 of the vehicle thermal management system 100 includes a can bus 5001, an input interface 5002, a memory 5003, one or more processors 5004 and an output interface 5005. Specifically, the input interface 5002 receives an operation request 5200; the memory 5003 is used to store instructions and data; the processor(s) 5004 read instructions and data from the memory 5003 and can write data to the memory 5003; and the output interface 5005 sends control signals to one or more or each actuator.

FIGS. 6-14 are example system diagrams of the vehicle thermal management system 100 shown in FIG. 1 to illustrate fluid flow states of the vehicle thermal management system 100 in different operating modes. The hollow line arrows indicate active refrigerant flow, and the bold solid arrows indicate active coolant flow, and other lines indicate connection with no current fluid flow. Each working mode will be described in detail as set forth below.

Figure 6:
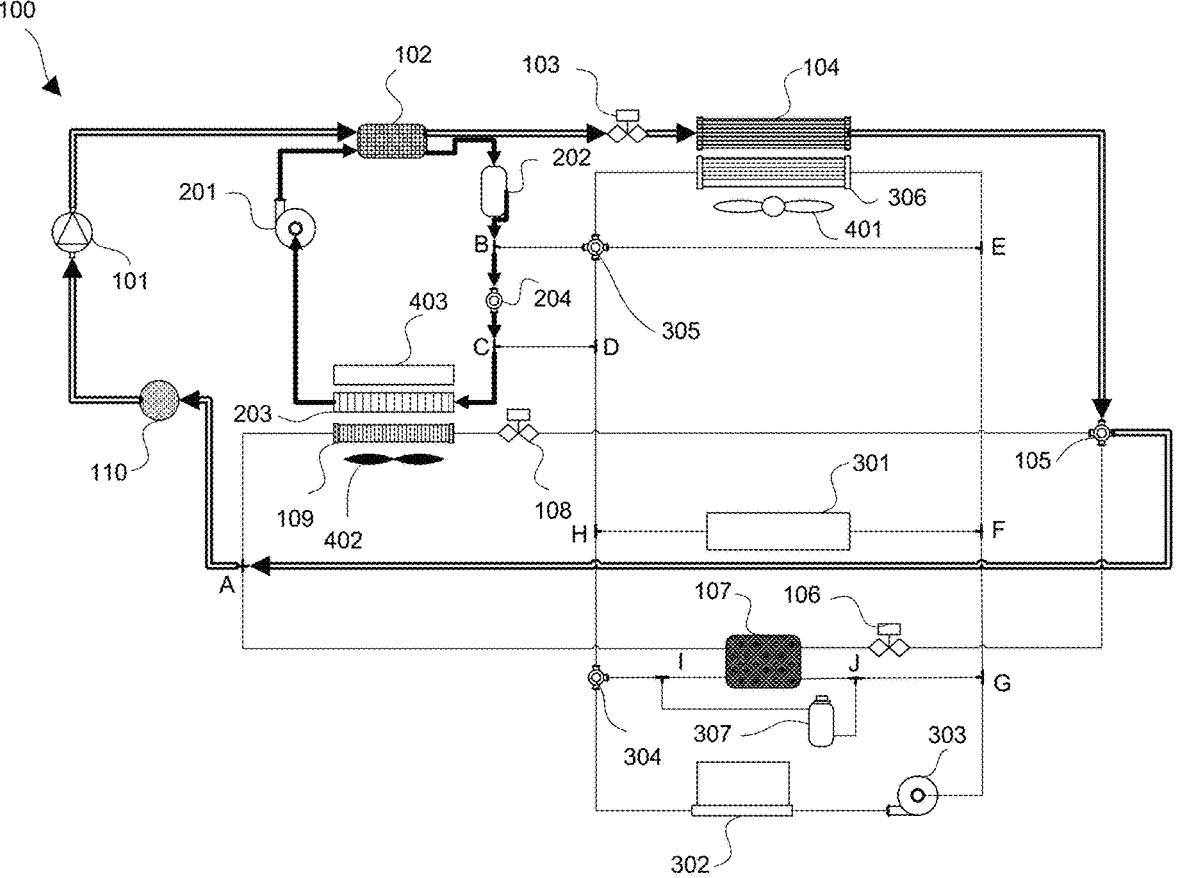
FIG. 6 is an operating schematic of the vehicle thermal management system shown in FIG. 1 under a mode of cabin heating with the heat pump system according to an embodiment of the present application.

FIG. 6 shows cabin heating with the heat pump system in the vehicle thermal management system 100. At low ambient temperatures, the vehicle thermal management system 100 can receive a cabin heating command to activate such operating mode if the heat pump system works appropriately. The high-temperature and high-pressure refrigerant flowing out from the compressor 101 passes through a refrigerant channel of the water condenser 102 and is condensed from a gaseous state to a liquid state under a cooling effect of the cooling liquid. The high-temperature and high-pressure refrigerant will decompress and increase in volume through the partially opened first expansion valve 103, forming a low-temperature and low-pressure liquid mist and entering the outside heat exchanger 104, which acts as an evaporator and absorbs a large amount of heat from the ambient environment. As the first four-way valve 105 connects the outside heat exchanger 104 and the pipeline junction A, the refrigerant will return to the gas-liquid accumulator 110 that separates liquid refrigerant and gas refrigerant, and is finally sucked by the compressor 101 to start the next refrigerant cycle. On the other hand, the low-temperature coolant pumped out by the first water pump 201 passes through a coolant channel of the water condenser 102 and absorbs the heat released by the refrigerant to generate high-temperature coolant. When the high-temperature coolant passes through the heater core 203, the blower 402 will blow out warm air to heat the cabin 403. It is noteworthy that the coolant heater 202 can be used to generate additional heat power if the heating performance of the heat pump system is insufficient.

Figure 7:
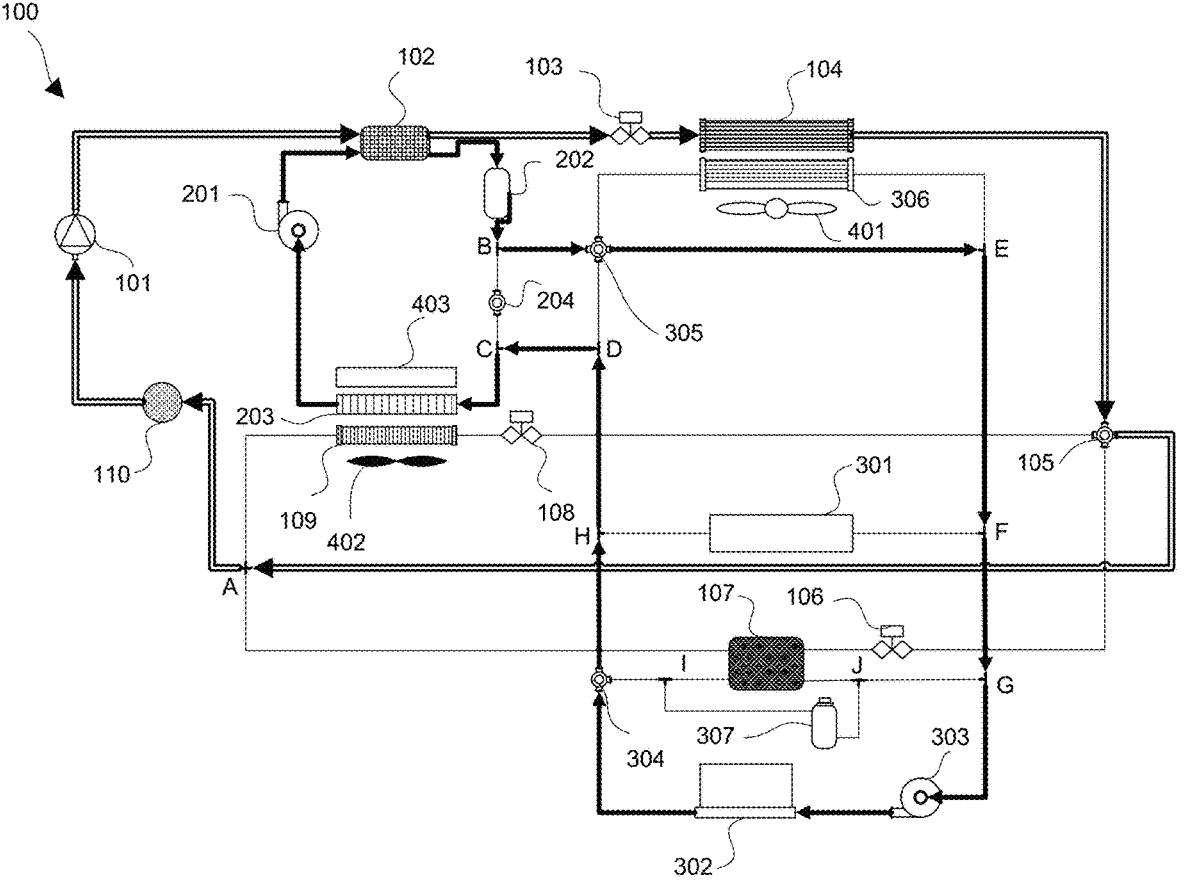
FIG. 7 is an operating schematic of the vehicle thermal management system shown in FIG. 1 under a mode of battery heating with the heat pump system according to an embodiment of the present application.

FIG. 7 shows battery heating with the heat pump system in the vehicle thermal management system 100. At low temperatures, the vehicle thermal management system 100 can receive a battery 302 heating command to activate such operating mode. The refrigerant circulation works in the same way as depicted in FIG. 6. The low-temperature coolant pumped out by the first water pump 201 passes through the coolant channel of the condenser 102 and absorbs the heat released by the refrigerant to generate high-temperature coolant. The second four-way valve 305 is controlled to connect the coolant flow at the water condenser 102 outlet and the pipeline junction E, which links the battery 302 coolant loop and the cabin coolant loop together. The high-temperature coolant will pass through the pipeline junction F and G to reach the inlet of the second water pump 303, which pumps the high-temperature coolant to heat the battery 302. At the cooling channel outlet of the battery 302, the coolant will pass through the three-way valve 304, the pipeline junction H, D, and C, the heater core 203, and finally return to the inlet of the first water pump 201. This mode can heat the cabin 403 and the battery 302 simultaneously. When the heating power of the heat pump system is insufficient, the coolant heater 202 can be activated.

Figure 8:
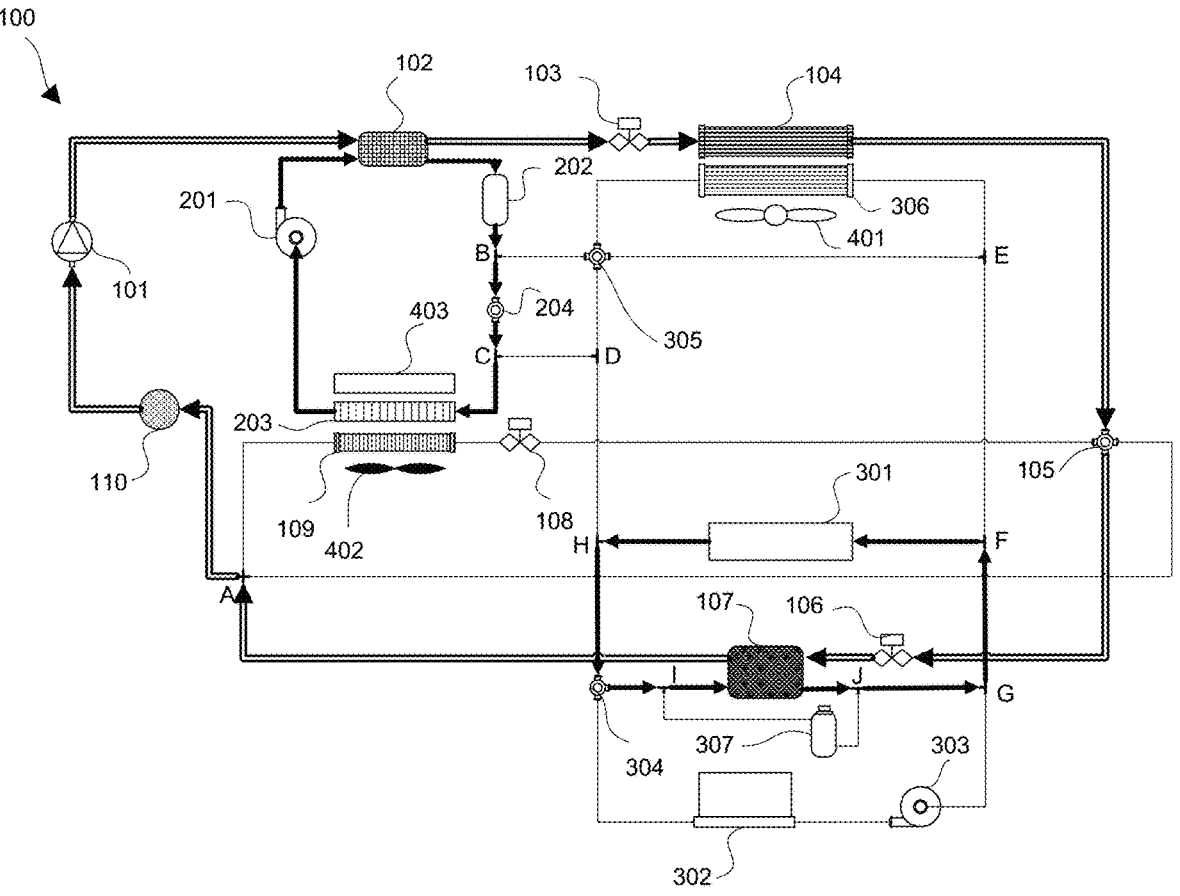
FIG. 8 is an operating schematic of the vehicle thermal management system shown in FIG. 1 under a mode of cabin heating with the heat pump system and heat recovery from the electric drive system according to an embodiment of the present application.

FIG. 8 shows cabin heating with the heat pump system and heat recovery from the electric drive system in the vehicle thermal management system 100. This mode is activated when there is frosting in the outside heat exchanger 104 and the efficiency of the heat pump system is affected. If the temperature of the coolant at an outlet of the electric drive cooling module 301 is relatively high, the waste heat of the electric drive can be used to defrost the outside heat exchanger 104 while heating the cabin 403. The high-temperature and high-pressure refrigerant flowing out from the compressor 101 passes through the refrigerant channel of the water condenser 102 and is partially condensed from the gaseous state to the liquid state. The first expansion valve 103 is fully opened so that the refrigerant entering the outside heat exchanger 104 is at high temperature condition to melt the frost on the fins or coils of the outside heat exchanger 104. The first four-way valve 105 is controlled to connect the outlet of the outside heat exchanger 104 and the inlet of the second expansion valve 106. A low-temperature and low-pressure liquid mist is formed as the second expansion valve 106 is partially opened and absorbs the heat from the coolant passing through the chiller 107. The refrigerant reaches the pipeline node A from the chiller 107 outlet, and then passes through a gas-liquid accumulator 110 to separate the liquid refrigerant and the gaseous refrigerant. The compressor sucks the gaseous refrigerant from the gas-liquid accumulator 110 to start the next refrigerant cycle. The electric drive cooling module 301 will pump the high-temperature coolant to flow through the pipeline junction H, the three-way valve 304, the chiller 107, and the pipeline junction F and G. This forms the coolant circulation for waste heat recovery of the electric drive system.

Figure 9:
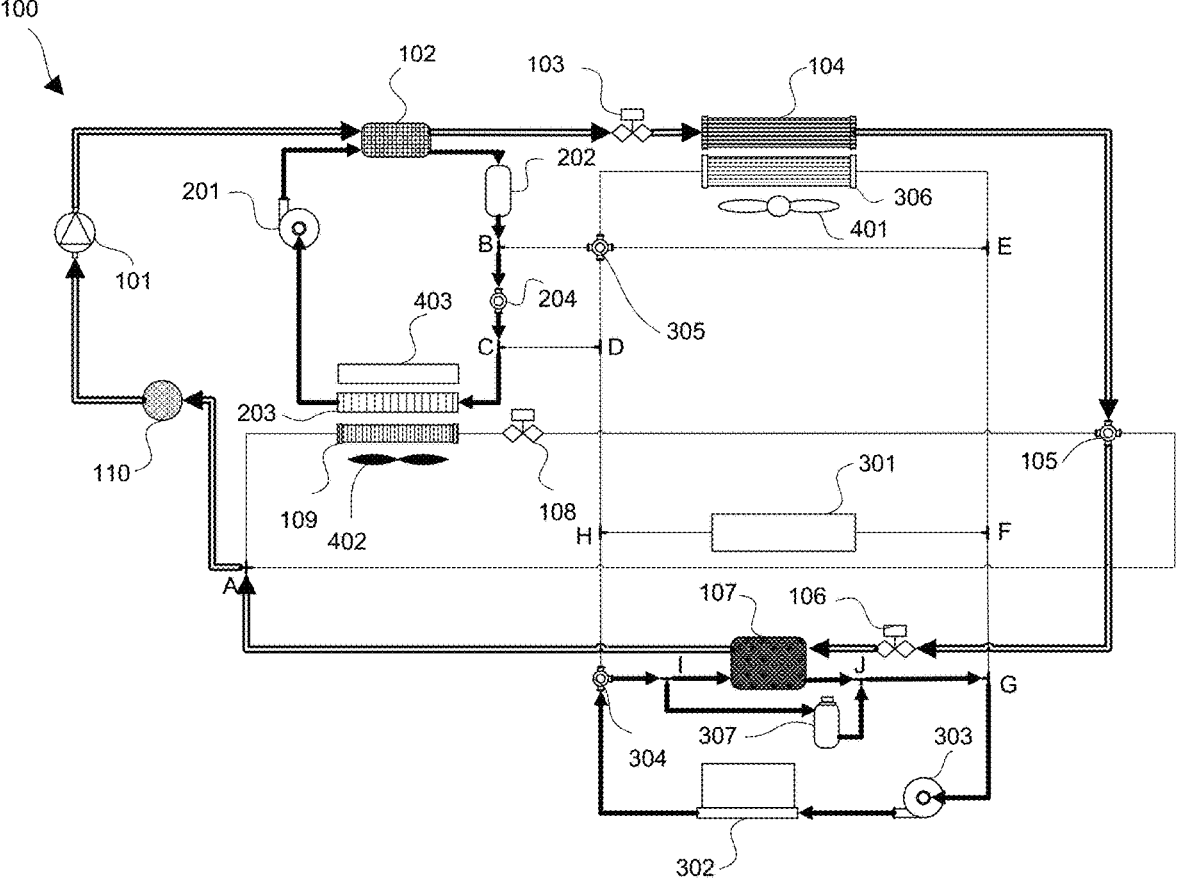
FIG. 9 is an operating schematic of the vehicle thermal management system shown in FIG. 1 under a mode of cabin heating with the heat pump system and heat recovery from the battery according to an embodiment of the present application.

FIG. 9 shows cabin heating with the heat pump system and heat recovery from the battery pack 302 in the vehicle thermal management system 100. Similar to the operating mode depicted in FIG. 8, this mode is activated when frosting of the outside heat exchanger 104 occurs and the coolant temperature at the cooling channel outlet of the battery 302 is high. The refrigerant circulation works in the same way as shown in FIG. 8. The second water pump 303 will pump the high-temperature coolant from the battery 302 to flow through the three-way valve 304 to reach the pipeline junction I, where the flow splits into a first branch of the chiller 107 and a second branch of the hot bottle 307 thereby reducing coolant aeration. The coolant will be converged at the pipeline junction J and pass through the pipeline junction G to return to the inlet of the second water pump 303. This forms the coolant circulation for waste heat recovery of the battery pack 302.

Figure 10:
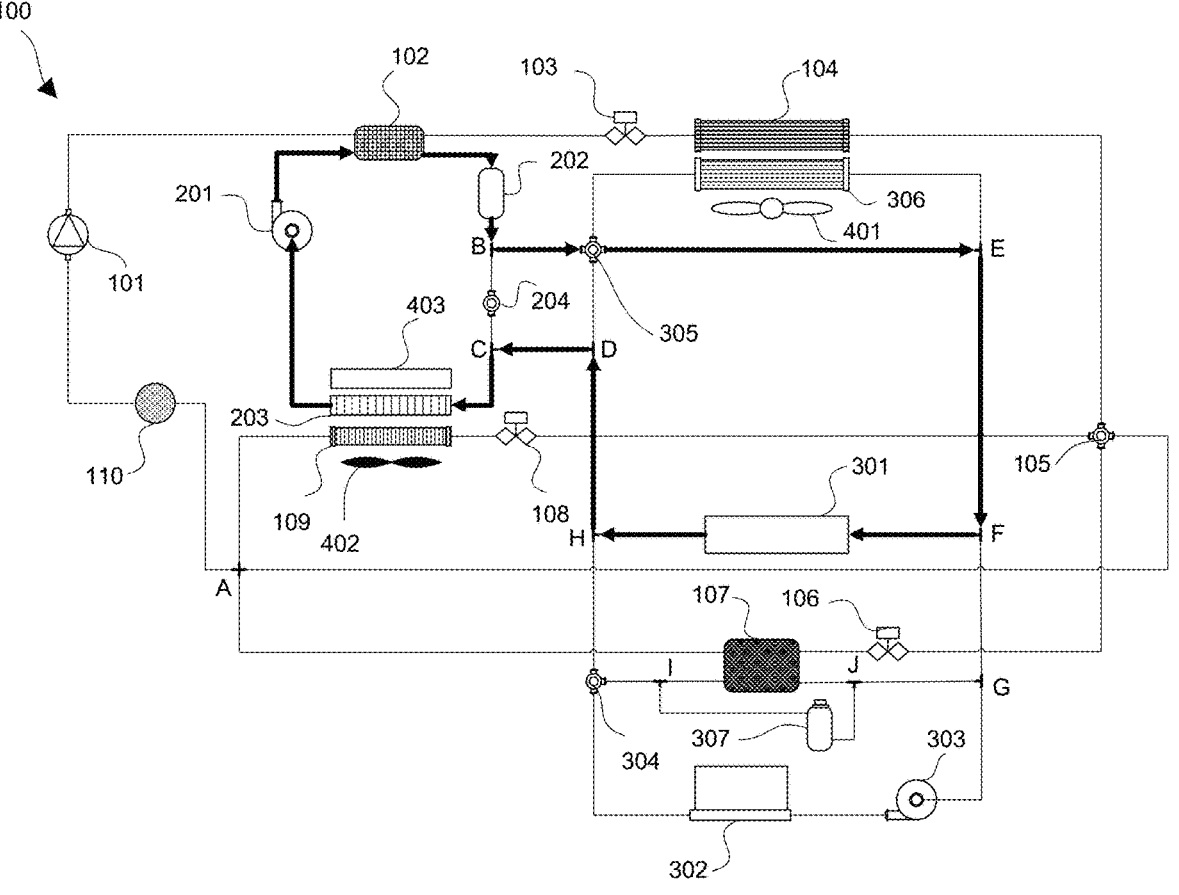
FIG. 10 is an operating schematic of the vehicle thermal management system shown in FIG. 1 under a mode of cabin heating with the electric drive system according to an embodiment of the present application.

FIG. 10 shows cabin heating with the electric drive system in the vehicle thermal management system 100. If the temperature of the coolant at the outlet of the electric drive cooling module 301 is high, the waste heat of the electric drive can be used to heat the cabin 403 directly. The electric drive cooling module 301 will pump the high-temperature coolant to flow through the pipeline junction H, D, and C to reach the heater core 203, where the blower 402 blows hot air through air-coolant heat exchange. The coolant at the outlet of the heater core 203 will be sucked by the first water pump 201, which continues to pump the coolant to pass through the water condenser 102, the coolant heater 202, the second four-way valve 305, the pipeline junction E and F, and finally returns to the inlet of the electric drive cooling module 301. This forms the coolant circulation for waste heat recovery of the electric drive system.

Figure 11:
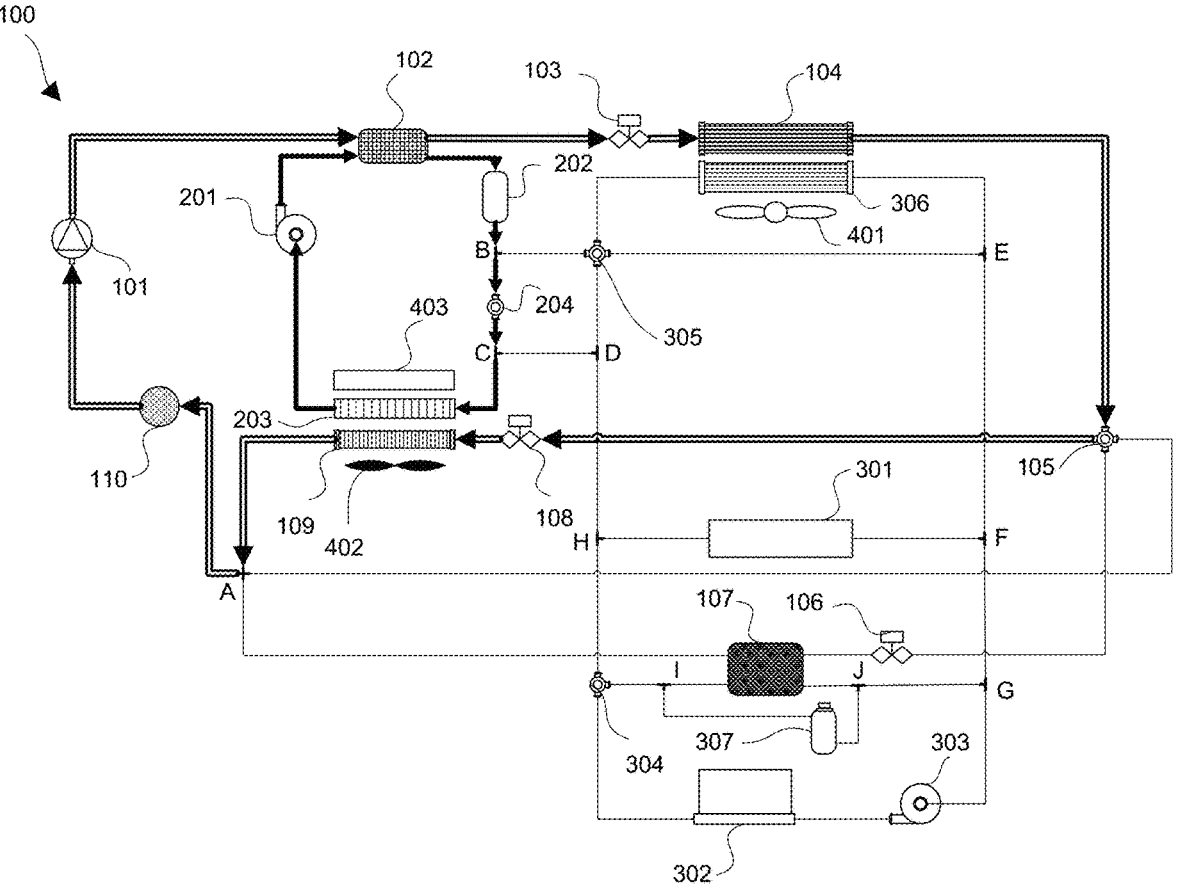
FIG. 11 is an operating schematic of the vehicle thermal management system shown in FIG. 1 under a mode of windshield defogging or defrosting with the heat pump system according to an embodiment of the present application.

FIG. 11 shows windshield defogging or defrosting with the heat pump system in the vehicle thermal management system 100. When the vehicle thermal management system 100 receives a command to defrost or defog a windshield of the vehicle, it needs to lower the air humidity through the evaporator 109 and raise the cabin air temperature through the heater core 203. The high-temperature and high-pressure refrigerant flowing out from the compressor 101 passes through the refrigerant channel of the water condenser 102 and the first expansion valve 103 that is fully opened. The outside heat exchanger 104 works as a condenser to dissipate the refrigerant heat to the environment. The first four-way valve 105 connects the outlet of the outside heat exchanger 104 with the third expansion valve 108, which is partially opened to generate the low-temperature and low-pressure liquid mist in the evaporator 109. The refrigerant exiting the evaporator 109 will pass through the pipeline junction A to reach the gas-liquid accumulator 110 that separates the liquid refrigerant and the gaseous refrigerant, and is finally sucked by the compressor 101 to start the next refrigerant cycle. On the other hand, the first water pump 201 will pump the coolant to passes through the coolant channel of the water condenser 102, the coolant heater 202, the pipeline junction B, the one-way valve 204, the pipeline junction C, and the heater core 203. Cooling of the cabin air will lower the humidity in the cabin 403. The heater core 203 can raise the cabin air temperature through the coolant-air heat exchange.

Figure 12:
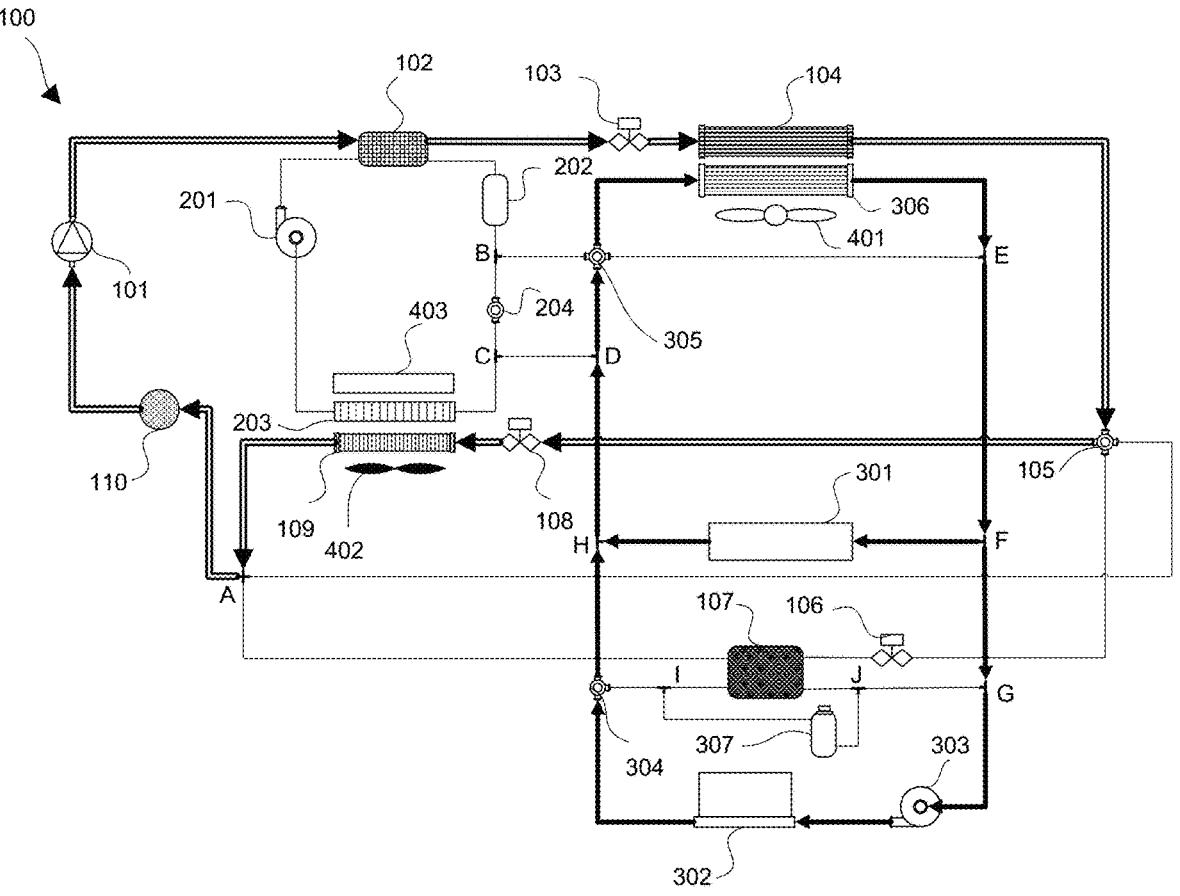
FIG. 12 is an operating schematic of the vehicle thermal management system shown in FIG. 1 under a mode of cabin cooling with the heat pump system and cooling of the battery and the electric drive system with a radiator according to an embodiment of the present application.

FIG. 12 shows cabin cooling with the heat pump system and cooling of the battery 302 and the electric drive system with the radiator 306 in the vehicle thermal management system 100. When the vehicle thermal management system 100 receives a command to cool the cabin 403, the cabin temperature is lowered by the evaporator 109. The refrigerant circulation works in the same way as depicted in FIG. 11. If the ambient temperature is moderate, the air-coolant heat exchange of the radiator 306 can provide sufficient cooling power for both the battery pack 302 and the electric drive system. The coolant pumped by the second water pump 303 will pass through the three-way valve 304 and is converged with the coolant pumped by the electric drive cooling module 301 at the pipeline junction H. By flowing through the pipeline junction D and the second four-way valve 305, the coolant heat is dissipated by the radiator 306 to provide the low-temperature coolant sucked by the second water pump 303 and the electric drive cooling module 301.

Figure 13:
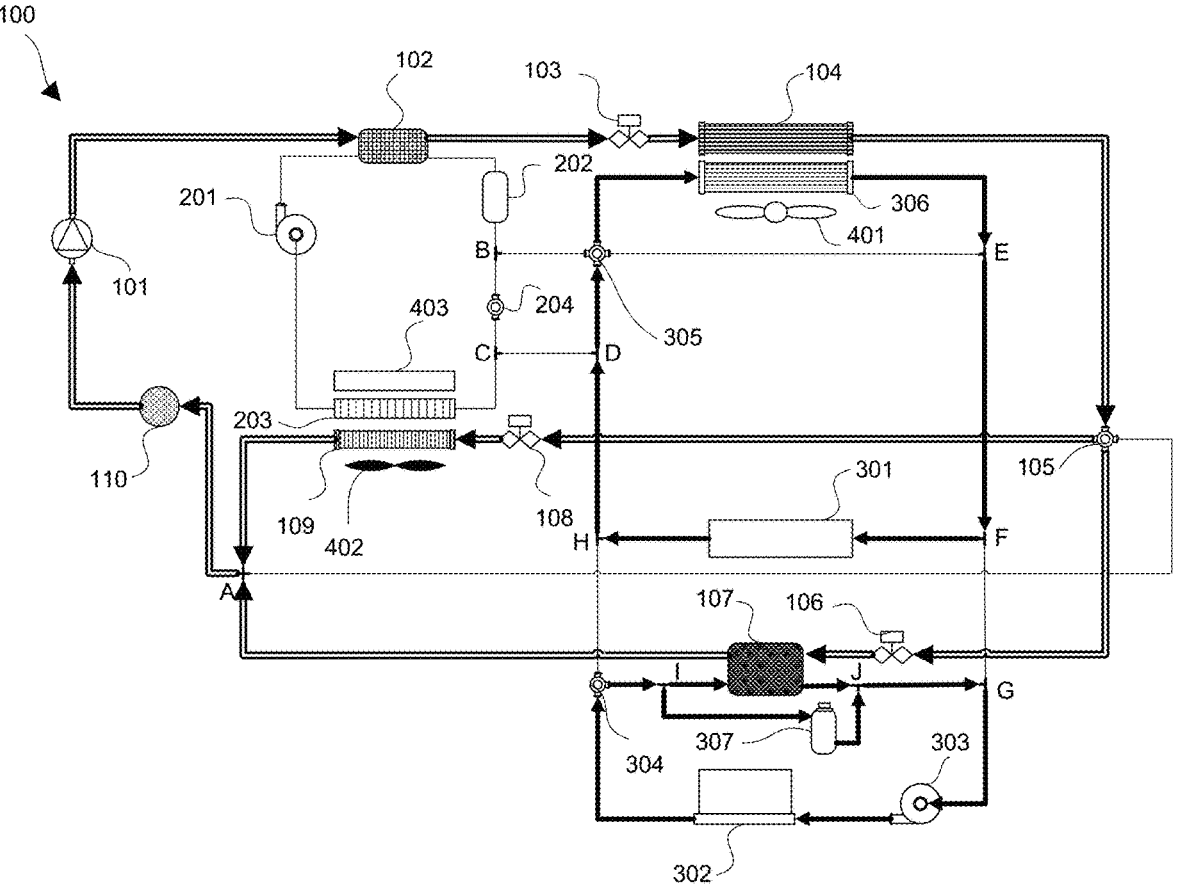
FIG. 13 is an operating schematic of the vehicle thermal management system shown in FIG. 1 under a mode of cabin and battery cooling with the heat pump system and cooling of the electric drive system with the radiator according to an embodiment of the present application.

FIG. 13 shows cabin cooling with the heat pump system and cooling of the battery pack or system 302 and the electric drive system with the radiator 306 in the vehicle thermal management system 100. At high ambient temperature conditions, the high-temperature battery coolant cannot exchange heat with the ambient air through the radiator 306, so the battery pack 302 needs to be cooled by the chiller 107. Compared with the refrigerant circulation shown in FIG. 12, the first four-way valve 105 connects the outlet of the outside heat exchanger 104 with both the second expansion valve 106 and the third expansion valve 108, which are partially opened. The low-temperature and low-pressure liquid mist in the evaporator 109 will cool the cabin through the blower 402, and the refrigerant of the same state in the chiller 107 will cool the battery 302 through the coolant flow. The coolant pumped by the second water pump 303 will pass through the battery 302, the three-way valve 304, the pipe junction I, the chiller 107, the hot bottle 307, and the pipeline junction J and G to form the coolant circulation for battery cooling. The coolant pumped by the electric drive cooling module 301 will pass through the pipeline junction H and D, the second four-way valve 305, the radiator 306, the pipeline junction E and F to form the coolant circulation for electric drive cooling.

Figure 14:
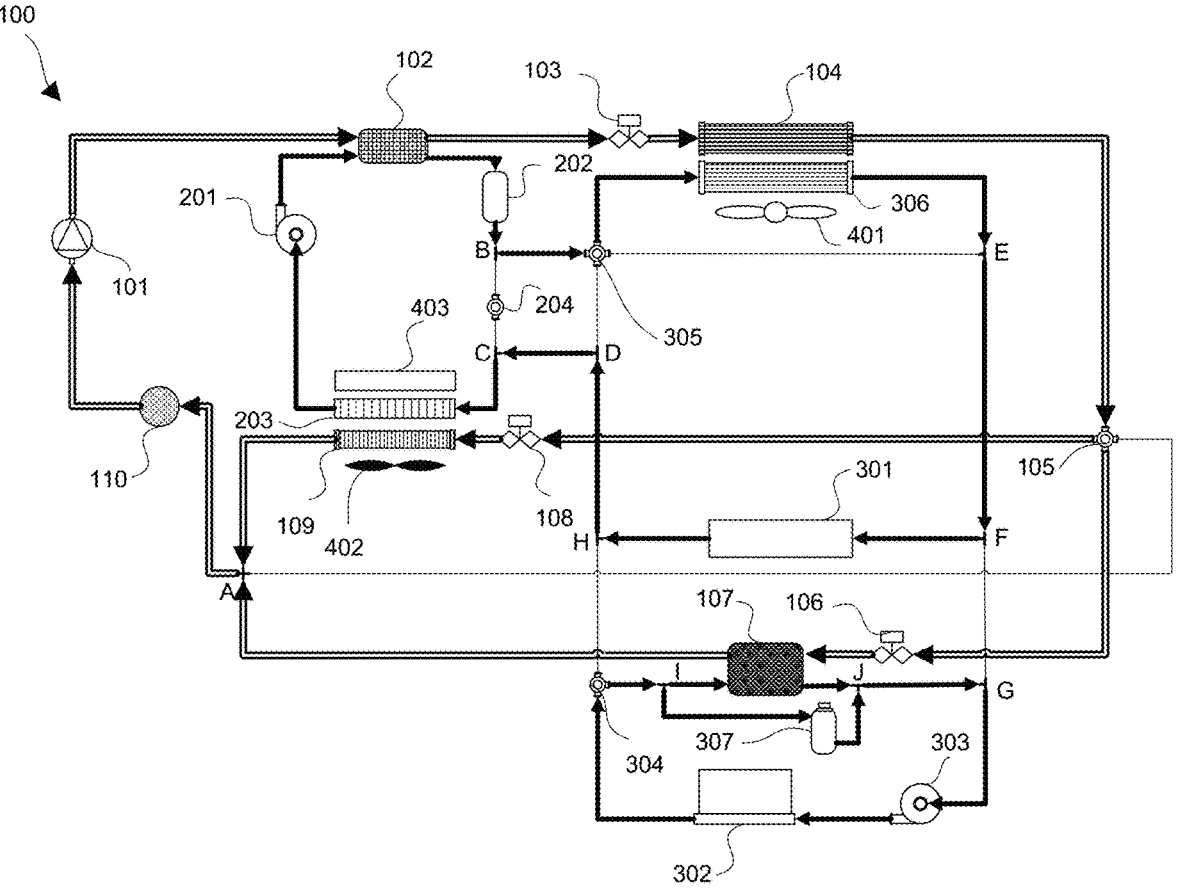
FIG. 14 is an operating schematic of the vehicle thermal management system shown in FIG. 1 under a mode of enhanced refrigerant cooling of the heat pump system for cabin and battery cooling according to an embodiment of the present application.

FIG. 14 shows enhanced refrigerant cooling of the heat pump system for cabin 403 and battery 302 cooling in the vehicle thermal management system 100. When the ambient temperature is extremely high or when the battery 302 generates large amount of heat (such as fast charge), the outdoor heat exchanger 104 cannot dissipate sufficient heat. Therefore, the water condenser 102 in the vehicle thermal management system 100 can provide additional cooling with coolant flowing through the radiator 306 that enhances the cooling performance. The refrigerant flows in the same way as depicted in FIG. 13. The coolant pumped by the first water pump 201 will pass through the water condenser 102, the coolant heater 202, the pipeline junction B, the second four-way valve 305, the radiator 306, the pipeline junction E and F, the electric drive cooling module 301, the pipeline junction H, H and C, and the heater core 203. The battery cooling flow is the same as shown in FIG. 13.

As used herein, the terms "comprise", "comprising", "includes", "including", "has", "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle thermal management system for an electrified vehicle having a cabin, the vehicle thermal management system comprising:

a heat pump system including a compressor, a water condenser, an outside heat exchanger, a chiller, an evaporator, a gas-liquid accumulator, a first electronic expansion valve, a second electronic expansion valve, a third electronic expansion valve, and a first four-way valve configured to be in fluid communication or selective fluid communication with each other during one or more operating modes of the thermal management system;

a cabin coolant loop including a first water pump, a coolant heater, a one-way valve, and a heater core configured to be in fluid communication or selective fluid communication with each other during one or more operating modes of the thermal management system;

a low-temperature coolant loop including an electric drive cooling module having an electric drive system, a battery pack, a second water pump, a second four-way valve, a three-way valve, a hot bottle, and a radiator;

a fan for providing airflow relative to the outside heat exchanger or the radiator or both and a blower for providing airflow relative to the evaporator or the heater core or both; and a control system in signal communication with the fan, blower, compressor, first and second water pumps, one-way valve, first and second four-way valves, first, second and third electronic expansion valves, the electric drive cooling module, the three-way valve and the heater core associated with the cabin coolant loop, wherein the control system is configured to use both the ambient environment and the coolant heater as heat sources to heat the battery pack at low ambient temperatures, including the control system controlling:

the first four-way valve to place the compressor, water condenser first expansion valve, gas-liquid accumulator and outside heat exchanger in refrigerant fluid communication with each other;

the one-way valve and the second four-way valve and the three-way valve to place the first and second water pumps, water condenser, battery pack and heater core in coolant fluid communication with each other;

the compressor to pump refrigerant in the heat pump system having a higher temperature state than coolant in the low temperature coolant circuit through the water condenser such that the coolant pumped through the water condenser by the first water pump absorbs rejected heat from the refrigerant thereby forming high temperature coolant utilized by the heater core to heat the cabin via the blower; and the second water pump to pump received high temperature coolant through the battery pack to heat the battery pack.

2. A vehicle thermal management system for an electrified vehicle having a cabin, the vehicle thermal management system comprising:

a heat pump system including a compressor, a water condenser, an outside heat exchanger, a chiller, an evaporator, a gas-liquid accumulator, a first electronic expansion valve, a second electronic expansion valve, a third electronic expansion valve, and a first four-way valve configured to be in fluid communication or selective fluid communication with each other during one or more operating modes of the thermal management system;

a cabin coolant loop including a first water pump, a coolant heater, a one-way valve, and a heater core configured to be in fluid communication or selective fluid communication with each other during one or more operating modes of the thermal management system;

a low-temperature coolant loop including an electric drive cooling module having an electric drive system, a battery pack, a second water pump, a second four-way valve, a three-way valve, a hot bottle, and a radiator;

a fan for providing airflow relative to the outside heat exchanger or the radiator or both and a blower for providing airflow relative to the evaporator or the heater core or both; and a control system in signal communication with the fan, blower, compressor, first and second water pumps, one-way valve, first and second four-way valves, first, second and third electronic expansion valves, the electric drive cooling module, the three-way valve and the heater core associated with the cabin coolant loop, wherein the control system is configured to use waste heat of the electric drive system to heat the cabin through the low temperature and cabin coolant loops at low ambient temperatures, including the control system controlling:

the one-way valve and the second four-way valve and the three-way valve to place the first water pump, water condenser, electric drive coolant module and heater core to be in coolant fluid communication with each other; and the second water pump to pump coolant through the electric drive coolant module to absorb waste heat from therefrom, resulting in high temperature coolant which then flows to the heater core where it is used to heat the cabin via the blower.

3. A vehicle thermal management system for an electrified vehicle having a cabin, the vehicle thermal management system comprising:

a heat pump system including a compressor, a water condenser, an outside heat exchanger, a chiller, an evaporator, a gas-liquid accumulator, a first electronic expansion valve, a second electronic expansion valve, a third electronic expansion valve, and a first four-way valve configured to be in fluid communication or selective fluid communication with each other during one or more operating modes of the thermal management system;

a cabin coolant loop including a first water pump, a coolant heater, a one-way valve, and a heater core configured to be in fluid communication or selective fluid communication with each other during one or more operating modes of the thermal management system;

a low-temperature coolant loop including an electric drive cooling module having an electric drive system, a battery pack, a second water pump, a second four-way valve, a three-way valve, a hot bottle, and a radiator;

a fan for providing airflow relative to the outside heat exchanger or the radiator or both and a blower for providing airflow relative to the evaporator or the heater core or both; and a control system in signal communication with the fan, blower, compressor, first and second water pumps, one-way valve, first and second four-way valves, first, second and third electronic expansion valves, the electric drive cooling module, the three-way valve and the heater core associated with the cabin coolant loop, wherein the control system is configured to use the heat pump system to perform windshield defogging and defrosting at low or medium ambient temperatures, including the control system controlling:

the first four-way valve to place the compressor, water condenser first expansion valve, outside heat exchanger, evaporator and gas-liquid accumulator in refrigerant fluid communication with each other;

the one-way valve and the second four-way valve to place the first water pump, water condenser and heater core in coolant fluid communication with each other;

the compressor to pump refrigerant in the heat pump system having a higher temperature state than coolant in the low temperature coolant circuit through the water condenser such that the coolant pumped through the water condenser by the first water pump absorbs rejected heat from the refrigerant thereby forming high temperature coolant flowing to the heater core; and controls the compressor to pump the refrigerant in the heat pump system, which also has a higher temperature state than ambient air when entering the outside heat exchanger through the outside heat exchanger, where the outside heat exchanger functions as a condenser to dissipate heat from the refrigerant to the environment thereby resulting in low temperature refrigerant flowing to the evaporator; and the blower to blow air through the evaporator and heater core resulting in the blown air having reduced humidity after passing through the evaporator and then a raised temperature after passing though the heater core resulting in higher temperature lower humidity air entering the cabin for use in performing the windshield defogging and defrosting.

* * * * *